J. W. AYLSWORTH.
ART OF MANUFACTURING ELECTRICAL INCANDESCING CONDUCTORS.
No. 553,296. Patented Jan. 21, 1896.
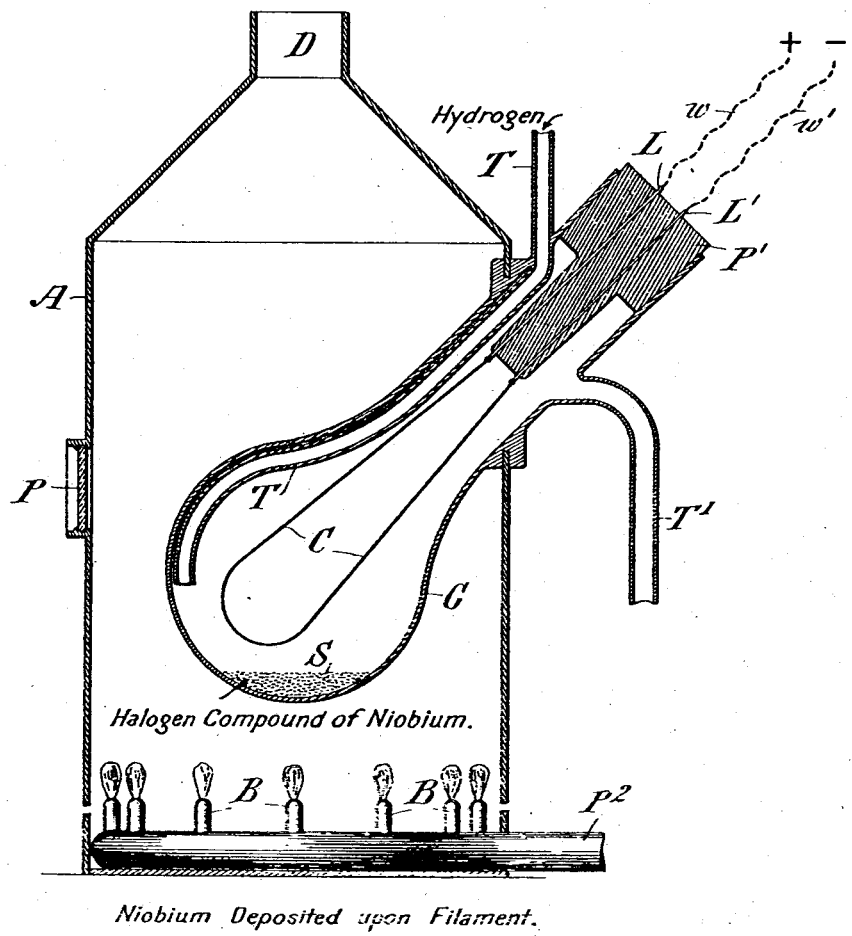

UNITED STATES PATENT OFFICE.

JONAS WALTER AYLSWORTH, OF NEWARK, NEW JERSEY, ASSIGNOR OF ONE-HALF TO CONVERSE D. MARSH, OF NEW YORK, N. Y.

ART OF MANUFACTURING ELECTRICAL INCANDESCING CONDUCTORS.

SPECIFICATION forming part of Letters Patent No. 553,296, dated January 21, 1896.

Application filed July 27, 1894. Renewed April 6, 1895. Serial No. 544,827. (No specimens.)

*To all whom it may concern:*

Be it known that I, JONAS WALTER AYLSWORTH, a citizen of the United States, residing at Newark, in the county of Essex and State of New Jersey, have made a new and useful Invention in the Art of Manufacturing Electrical Incandescing Conductors, of which the following is a specification.

My invention relates particularly to a novel method of making such conductors from refractory metals, as tantalum, niobium, titanium, molybdenum, zirconium and other metals of the same general class which are known to be non-fusible for such temperatures as are capable of practical application in the arts and also are non-ductile.

My invention has for its object the conversion of such refractory metals into such form or condition as will render them capable of practical use for incandescing conductors and for use generally in the arts. Prior to my invention no one, so far as I am aware, has been enabled to convert metals of this generic type into sheets, bars, rods or wires. I accomplish this result by heating a base or support in the vapor of a volatile halogen compound of the element which it is desired to deposit and simultaneously mix it with a reducing-gas, as hydrogen.

My invention will be fully understood by referring to the accompanying drawing, which illustrates in sectional view an apparatus for preparing an incandescent electrical conductor of any of the metals of the character named.

Referring to the drawing in detail, A represents a heating-chamber provided with an outlet D for the products of combustion and any type of heating device, as a Bunsen or other gas-burner, having gas-tips B B, the same being connected by a supply-pipe P² with a gas-main. (Not shown.)

P is a peep-hole in the side of the heating-chamber for observing the different stages of the process.

G is a retaining-vessel, made of glass, capable of withstanding great heat and having two tubes T and T', the former for admitting hydrogen gas under pressure and the latter for conveying away the resultant gases or vapors.

P' is the usual form of incandescent lamp-stopper provided with in-leading wires L and L', connected at their outer ends to conductors $w$ and $w'$, which run to a generator of electricity, (not shown,) but having sufficient voltage and current capacity to heat a carbon or other conducting base or support C to incandescence.

S represents the halogen compound of the metal to be treated.

I take an ore of the metal to be treated—such, for instance, as columbite, which is a well-known ore of niobium—and I treat it by any well-known chemical process for separating the oxides of such metals and obtain in this manner niobium oxide or oxides of equivalent metals, or such as belong to or are closely allied to the same group as niobium—as, for instance, tantalum. After the oxide is thus separated from its ore I then convert it into a volatile halogen compound by the well-known application of mixing such oxides with charcoal and heat it to a high degree of temperature in a current of dry halogen gas, such as chlorine or bromine. This halogen compound S is seen in position in the retaining-vessel G. I now submit the retaining-vessel and its contents to the heat of Bunsen burners or other extraneous heating agencies B B, and simultaneously pass through the chamber a stream of a reducing-gas, as hydrogen, by way of the inlet and outlet tubes T and T'. I then pass a sufficient current of electricity through the conductors $w$ $w'$ and the carbon or other base or support C to heat it to incandescence without rupture. There results from the union of the hydrogen gas and vapors arising from the halogen compound a deposit of the pure metal, as niobium, upon the filament base or support C. This process is continued until the deposit reaches the desired thickness.

Halogen compounds of any of the highly-refractory metals above referred to or any of the equivalent highly-refractory metals known in the art of metallurgy may be used in place of the halogen compound of niobium and the pure metals thereof deposited in the manner indicated. I have succeeded in depositing in this manner tantalum, niobium, molybdenum, titanium, and zirconium, continuing the process in each instance until the carbon core or other conducting filament C was surrounded with such metals.

I do not limit myself to the application of any special means of heating the containing-vessel G, as the same might be effected by applying heat thereto in any manner which will readily suggest itself to those skilled in the art.

Although I have shown herein a special application of my improved process in the production of an incandescing conductor or filament from any of the metals of the general character referred to, I do not limit myself to the application of this process for such special purpose, as it is obvious that the process might be applied to the manufacture of sheets or bars of such metals by depositing the same upon one or both sides of a flat sheet of such material heated either electrically or from one side by any extraneous source of heat applied thereto.

My claims are directed broadly to the application of the generic principle herein enunciated of depositing refractory metals of the character named upon a base or support to such an extent as to construct wires, sheets or bars of the material so deposited, which wires, sheets or bars may be capable of various uses in the arts.

I make no claim in the present application to an incandescing conductor made of any of the refractory metals of the same generic class, as claims are made in separate applications of even date herewith to incandescing conductors constructed of these particular types of metal.

I am aware of United States Patent No. 401,120, granted April 9, 1889, to Turner D. Bottome, and of United States Patent No. 487,046, granted November 29, 1892, to James Clegg, and I make no claim hereinafter broad enough to include the processes described in said patents for the purpose of strengthening carbon filaments, my invention being directed broadly to a novel method of making a metallic filament of any of the refractory metals hereinbefore referred to and in accordance with the method or process hereinbefore described and hereinafter particularly claimed.

Having thus described my invention, what I claim, and desire to secure by Letters Patent of the United States, is—

1. The described method or process of depositing any of the hereinbefore named refractory metals upon a surface which consists in subjecting a halogen compound of such metal to the action of heat and a reducing vapor or gas as hydrogen, and at the same time electrically heating the surface upon which the metal is to be deposited.

2. The described method or process of constructing an incandescing conductor for an electric lamp, consisting in subjecting a halogen compound of a refractory metal and a reducing vapor or gas to heat and simultaneously passing a sufficient current of electricity through a conducting base or support to effect a deposit of the metal of the halogen compound upon said base or support.

3. The described method or process of preparing incandescing electrical conductors of highly refractory metals, consisting in subjecting a halogen compound of the metal to be used to the effects of heat and a reducing gas and simultaneously giving to a conducting base filament or support surrounded by said gas and the vapors emanating from the halogen compound an incandescence sufficient to effect a deposit of the metal of the compound upon the base filament or support.

4. The described method or process of producing or preparing incandescing filaments or wires from refractory metals as niobium, consisting in subjecting a halogen compound of the metal to the united influence of heat and a reducing gas and simultaneously giving to a conducting filament or base surrounded by the gas and the vapor of the halogen compound an incandescence sufficient to cause the metal of the halogen compound to be deposited thereon.

In testimony whereof I have hereunto subscribed my name this 13th day of July, 1894.

JONAS WALTER AYLSWORTH.

Witnesses:
C. J. KINTNER,
M. M. ROBINSON.